US012662963B1

(12) United States Patent
Maalouf

(10) Patent No.: US 12,662,963 B1
(45) Date of Patent: Jun. 23, 2026

(54) AIR SYSTEM FOR AIRCRAFT POWERPLANT

(71) Applicant: RTX Corporation, Farmington, CT (US)

(72) Inventor: Fadi S. Maalouf, East Hampton, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/197,681

(22) Filed: May 2, 2025

(51) Int. Cl.
| | |
|---|---|
| *F02C 7/18* | (2006.01) |
| *F01D 5/08* | (2006.01) |
| *F01D 25/12* | (2006.01) |
| *F02C 6/08* | (2006.01) |
| *F02C 9/18* | (2006.01) |

(52) U.S. Cl.
CPC .............. *F02C 7/185* (2013.01); *F01D 5/081* (2013.01); *F01D 25/12* (2013.01); *F02C 6/08* (2013.01); *F02C 9/18* (2013.01); *F05D 2220/323* (2013.01); *F05D 2240/128* (2013.01); *F05D 2240/55* (2013.01); *F05D 2260/213* (2013.01); *F05D 2260/606* (2013.01)

(58) Field of Classification Search
CPC .... F02C 6/08; F02C 7/12; F02C 7/125; F02C 7/18; F02C 7/185; F02C 9/18; F01D 5/081; F01D 5/087; F01D 11/24; F01D 25/08; F01D 25/12; F01D 25/14; F05D 2260/213
See application file for complete search history.

(56) References Cited

U.S. PATENT DOCUMENTS

| | | | | |
|---|---|---|---|---|
| 4,918,926 | A | * | 4/1990 | Nikkanen ................. F23R 3/04 |
| | | | | 60/751 |
| 5,317,877 | A | | 6/1994 | Stuart |
| 6,035,627 | A | * | 3/2000 | Liu ..................... F04D 29/0513 |
| | | | | 415/176 |
| 10,337,406 | B2 | | 7/2019 | Suciu |
| 10,627,167 | B2 | * | 4/2020 | Sampath ................ F02C 7/185 |
| 10,669,938 | B2 | | 6/2020 | Suciu |
| 10,704,468 | B2 | | 7/2020 | Suciu |
| 10,760,491 | B2 | | 9/2020 | Suciu |
| 10,808,616 | B2 | | 10/2020 | Suciu |
| 10,907,546 | B2 | | 2/2021 | Schmitz |
| 11,035,251 | B2 | | 6/2021 | Shinde |
| 11,499,479 | B2 | | 11/2022 | Gould |
| 2020/0300164 | A1 | | 9/2020 | Muldoon |

* cited by examiner

*Primary Examiner* — Kyle Robert Thomas
(74) *Attorney, Agent, or Firm* — Getz Balich LLC

(57) ABSTRACT

An aircraft powerplant assembly includes a compressor rotor, a compressor vane structure, a diffuser structure, a combustor and an air system. The compressor rotor includes a rotor stage and a rotor hub. The rotor hub includes a hub wall connected to a rotor base. An outer surface of the hub wall forms an inner peripheral boundary of a first section of an air passage. The compressor vane structure is radially outboard of the hub wall. The diffuser structure includes a diffuser nozzle and a diffuser plenum. The combustor is disposed in the diffuser plenum. The air system includes an air circuit and a heat exchanger. The air system is configured to bleed compressed air from the diffuser plenum through a circuit inlet, cool the compressed air with the heat exchanger to provide cooled air, and direct the cooled air into the air passage through a circuit outlet.

19 Claims, 8 Drawing Sheets

AIR SYSTEM FOR AIRCRAFT POWERPLANT

BACKGROUND OF THE DISCLOSURE

1. Technical Field

This disclosure relates generally to an aircraft and, more particularly, to an air system for an aircraft propulsion system.

2. Background Information

An aircraft powerplant such as a turbofan propulsion system may include one or more air systems. Various types and configurations of air systems are known in the art. While these known air systems have various benefits, there is still room in the art for improvement.

SUMMARY OF THE DISCLOSURE

According to an aspect of the present disclosure, an assembly is provided for an aircraft powerplant. This assembly includes a compressor rotor, a compressor vane structure, a diffuser structure, a combustor, a core flowpath and an air system. The compressor rotor is configured to rotate about an axis. The compressor rotor includes a rotor stage and a rotor hub. The rotor stage includes a rotor base and a plurality of compressor blades connected to the rotor base. The compressor blades are arranged circumferentially about the rotor base in a compressor blade array. The rotor hub includes a hub wall connected to the rotor base. An outer surface of the hub wall tapers radially inward towards the axis as the hub wall projects axially away from the rotor base. The outer surface of the hub wall forms an inner peripheral boundary of at least a first section of an air passage. The compressor vane structure is axially next to the rotor stage and radially outboard of the hub wall. The compressor vane structure includes a plurality of compressor vanes arranged circumferentially about the axis in a compressor vane array. The diffuser structure includes a diffuser nozzle and a diffuser plenum. The diffuser nozzle is radially outboard of the hub wall and the air passage. The combustor is disposed in the diffuser plenum. The core flowpath extends longitudinally across the compressor blades and through the compressor vane structure, the diffuser nozzle and the diffuser plenum into the combustor. The air system includes an air circuit and a heat exchanger. The air circuit extends longitudinally from a circuit inlet through the heat exchanger to a circuit outlet. The air system is configured to bleed compressed air from the diffuser plenum through the circuit inlet, cool the compressed air with the heat exchanger to provide cooled air, and direct the cooled air into the air passage through the circuit outlet.

According to another aspect of the present disclosure, another assembly is provided for an aircraft powerplant. This assembly includes a compressor rotor, a compressor vane structure, a core flowpath and an air system. The compressor rotor is configured to rotate about an axis. The compressor rotor includes a rotor stage and a rotor hub. The rotor stage includes a rotor base and a plurality of compressor blades connected to the rotor base. The compressor blades are arranged circumferentially about the rotor base in a compressor blade array. The rotor hub includes a seal element and a hub wall connected to the rotor base. The hub wall tapers radially inward towards the axis as the hub wall projects axially away from the rotor base. The seal element projects radially out from the hub wall. The rotor hub forms a peripheral boundary of an air passage. The compressor vane structure is axially next to the rotor stage and radially outboard of the hub wall. The compressor vane structure includes a seal land and a plurality of compressor vanes arranged circumferentially about the axis in a compressor vane array. The seal land is radially outboard of and configured to form a seal with the seal element. The core flowpath extends longitudinally across the compressor blades and through the compressor vane structure. The air system includes an air circuit and a heat exchanger. The air circuit extends longitudinally from a circuit inlet through the heat exchanger to a circuit outlet. The air system is configured to bleed compressed air from the core flowpath downstream of the rotor stage and upstream of the combustor through the circuit inlet, cool the compressed air with the heat exchanger to provide cooled air, and direct the cooled air into the air passage through the circuit outlet in an axial direction towards the seal element.

According to still another aspect of the present disclosure, another assembly is provided for an aircraft powerplant. This assembly includes a compressor rotor, a compressor vane structure, a diffuser structure, a combustor, a core flowpath, a baffle wall and an air system. The compressor rotor is configured to rotate about an axis. The compressor rotor includes a rotor stage and a rotor hub. The rotor stage includes a rotor base and a plurality of compressor blades connected to the rotor base. The compressor blades are arranged circumferentially about the rotor base in a compressor blade array. The rotor hub include a hub wall connected to the rotor base. The hub wall tapers radially inward towards the axis as the hub wall projects axially away from the rotor base. The hub wall forms an inner peripheral boundary of at least a first section of an air passage. The compressor vane structure is axially next to the rotor stage and radially outboard of the hub wall. The diffuser structure includes a diffuser nozzle and a diffuser plenum. The diffuser nozzle is radially outboard of the hub wall. The combustor is disposed in the diffuser plenum. The core flowpath extends longitudinally across the compressor blades and through the compressor vane structure, the diffuser nozzle and the diffuser plenum into the combustor. The baffle wall is mounted to the diffuser structure. The baffle wall follows a contour of the rotor hub and forms an outer peripheral boundary of at least the first section of the air passage. An air cavity is disposed radially and/or axially between the baffle wall and the diffuser structure. The air system includes an air circuit and a heat exchanger. The air circuit extends longitudinally from a circuit inlet through the heat exchanger to a circuit outlet. The air system is configured to bleed compressed air from the core flowpath through the circuit inlet, cool the compressed air with the heat exchanger to provide cooled air, and direct the cooled air into a second section of the air passage through the circuit outlet. The second section of the air passage is upstream of the first section of the air passage.

The assembly may also include a diffuser structure and a combustor. The diffuser structure may include a diffuser nozzle and a diffuser plenum. The diffuser nozzle may be radially outboard of the hub wall. The combustor may be disposed in the diffuser plenum. The core flowpath may extend longitudinally from the compressor vane structure through the diffuser nozzle and the diffuser plenum into the combustor. The circuit inlet may be fluidly coupled to the diffuser plenum.

The air system may be configured to direct the cooled air into a second section of the air passage through the circuit outlet. The second section of the air passage may be upstream of the first section of the air passage.

The rotor hub may also include a seal element projecting radially out from the hub wall. The seal element may be configured to form a seal with a seal land coupled to an inner wall of the compressor vane structure. The seal element may form an axial boundary of the second section of the air passage.

The air system may be configured to direct the cooled air into the second section of the air passage through the circuit outlet to impinge against the seal element.

The air system may be configured to direct the cooled air into a second section of the air passage through the circuit outlet. The second section of the air passage may be radially outboard of the first section of the air passage.

The air system may be configured to direct the cooled air into a second section of the air passage through the circuit outlet. The second section of the air passage may be radially inboard of and partially formed by the compressor vane structure.

The air system may be configured to direct the cooled air along an axial trajectory through the circuit outlet into the air passage.

The assembly may also include a baffle wall mounted to the diffuser structure.

The baffle wall may follow a contour of the rotor hub and may form an outer peripheral boundary of at least the first section of the air passage.

An air cavity may be disposed between the baffle wall and the diffuser structure.

The rotor stage may be a last compressor rotor stage upstream of the diffuser structure along the core flowpath.

The diffuser nozzle may be axially next to the compressor vane structure.

The diffuser nozzle may include an inner nozzle wall and an outer nozzle wall. The inner nozzle wall and the outer nozzle wall may radially diverge away from one another as the inner nozzle wall and the outer nozzle wall project axially away from the compressor vane structure.

The diffuser nozzle may also include a plurality of struts arranged circumferentially about the axis in a strut array. Each of the struts may project radially across the core flowpath from the inner nozzle wall to the outer nozzle wall.

The assembly may also include a rotating structure configured to rotate about the axis. The rotating structure may include the compressor rotor and a turbine rotor. The combustor may be disposed axially along the axis between the compressor rotor and the turbine rotor.

The heat exchanger may be configured as or otherwise include an air-to-air heat exchanger.

The powerplant may include a compressor section, a combustor, a turbine section and a bypass flowpath. The compressor section may include the compressor rotor and the compressor vane structure. The combustor section may include the diffuser structure and the combustor. The bypass flowpath may bypass the compressor section, the combustor section and the turbine section. The heat exchanger may be configured to receive bypass air bled from the bypass flowpath.

The powerplant may also include a compressor section, a combustor section, a turbine section and a bypass flowpath. The compressor section may include the compressor rotor and the compressor vane structure. The combustor section may include the diffuser structure and the combustor. The bypass flowpath may bypass the compressor section, the combustor section and the turbine section. The air system may also include a second air circuit. The second air circuit may extend longitudinally from a second circuit inlet through the heat exchanger to a second circuit outlet. The second circuit inlet may fluidly couple the second air circuit to the bypass flowpath. The second circuit outlet may fluidly couple the second air circuit to the bypass flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
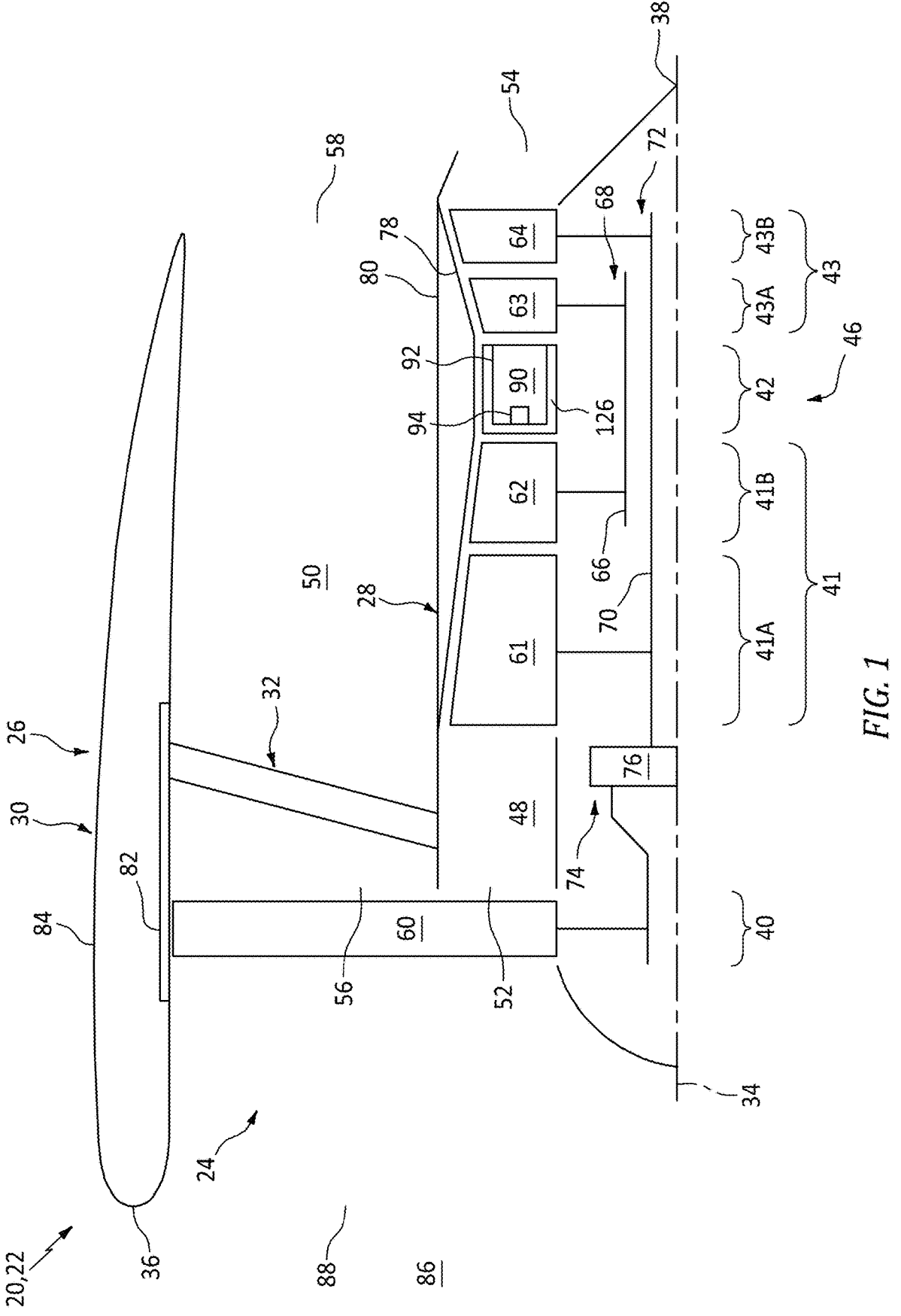
FIG. 1 is a partial schematic sectional illustration of an aircraft propulsion system.

FIG. 1 illustrates a powerplant 20 for an aircraft. The aircraft may be an airplane, a drone (e.g., an unmanned aerial vehicle (UAV)) or any other manned or unmanned aerial vehicle or system. For case of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 extends axially along an axis 34 of the aircraft propulsion system 22 between an axial upstream, forward end 36 of the aircraft propulsion system 22 and an axial downstream, aft end 38 of the aircraft propulsion system 22. Briefly, the propulsion system axis 34 may be a centerline axis of the aircraft propulsion system 22, the turbine engine 24 and/or one or more of its members. The propulsion system axis 34 may also or alternatively be a rotational axis for one or more members of the turbine engine 24.

The aircraft propulsion system 22 and its turbine engine 24 of FIG. 1 include a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. At least (or only) the LPC section 41A, the HPC section 41B, the combustor section 42, the HPT section 43A and the LPT section 43B collectively form a core 46 of the turbine engine 24. The aircraft propulsion system 22 and its turbine engine 24 of FIG. 1 also include a core flowpath 48 (e.g., an annular core flowpath) and a bypass flowpath 50 (e.g., an annular bypass flowpath). The core flowpath 48 extends sequentially longitudinally (e.g., axially along the propulsion system axis 34 in FIG. 1) through the LPC section 41A, the HPC section 41B, the combustor section 42, the HPT section 43A and the LPT section 43B from an airflow inlet 52 into the core flowpath 48 to a combustion products exhaust 54 out from the core flowpath 48. The bypass flowpath 50 extends longitudinally (e.g., axially along the propulsion system axis 34 in FIG. 1) through a bypass duct from an airflow inlet 56 into the bypass flowpath 50 to an airflow exhaust 58 from the bypass flowpath 50, where the bypass duct may be formed by the inner housing structure 28 and the outer housing structure 30. The bypass flowpath 50 and its bypass duct are configured to bypass (e.g., are disposed radially outboard of and extend along) the engine core 46 and the inner housing structure 28.

The propulsor section 40, the LPC section 41A, the HPC section 41B, the combustor section 42, the HPT section 43A and the LPT section 43B may be arranged sequentially along the propulsion system axis 34 within the propulsion system housing 26. The propulsor section 40 includes a bladed propulsor rotor 60; e.g., a fan rotor. The LPC section 41A includes a bladed low pressure compressor (LPC) rotor 61. The HPC section 41B includes a bladed high pressure compressor (HPC) rotor 62. The HPT section 43A includes a bladed high pressure turbine (HPT) rotor 63. The LPT section 43B includes a bladed low pressure turbine (LPT) rotor 64.

The HPC rotor 62 is coupled to and rotatable with the HPT rotor 63. The HPC rotor 62 of FIG. 1, for example, is connected to the HPT rotor 63 through a high speed shaft 66. At least (or only) the HPC rotor 62, the HPT rotor 63 and the high speed shaft 66 collectively form a high speed rotating structure 68; e.g., a high speed spool of the turbine engine 24 and its engine core 46. This high speed rotating structure 68 of FIG. 1 and its members 62, 63 and 66 are rotatable about the propulsion system axis 34.

The LPC rotor 61 is coupled to and rotatable with the LPT rotor 64. The LPC rotor 61 of FIG. 1, for example, is connected to the LPT rotor 64 through a low speed shaft 70. At least (or only) the LPC rotor 61, the LPT rotor 64 and the low speed shaft 70 collectively form a low speed rotating structure 72; e.g., a low speed spool of the turbine engine 24 and its engine core 46. This low speed rotating structure 72 of FIG. 1 and its members 61, 64 and 70 are rotatable about the propulsion system axis 34.

The low speed rotating structure 72 is coupled to the propulsor rotor 60 through a rotating structure-to-propulsor (RSP) drivetrain 74. The RSP drivetrain 74 may be configured as a geared drivetrain, where a geartrain 76 (e.g., a transmission, a speed change device, an epicyclic geartrain, etc.) is disposed between and operatively couples the propulsor rotor 60 to the low speed rotating structure 72 and its LPT rotor 64. With this arrangement, the propulsor rotor 60 may rotate at a different (e.g., slower) rotational speed than the low speed rotating structure 72 and its LPT rotor 64. Here, the propulsor rotor 60 and the low speed rotating structure 72 may rotate in a common (the same) direction about the propulsion system axis 34 or in opposite directions about the propulsion system axis 34 depending, for example, upon the specific configuration of the geartrain 76. Alternatively, the RSP drivetrain 74 may be configured as a direct-drive drivetrain, where the geartrain 76 is omitted. With such an arrangement, the propulsor rotor 60 rotates at a common (the same) rotational speed as the low speed rotating structure 72 and its LPT rotor 64.

The inner housing structure 28 of FIG. 1 includes an inner case 78 (e.g., a core case) for the turbine engine 24 and an inner nacelle structure 80 (sometimes referred to as an inner fixed structure (IFS)). The inner case 78 is disposed radially outboard of, extends axially along and may circumscribe one or more or all of the engine sections 41A-43B and the engine rotors 61-64. The inner case 78 may thereby house and provide a support structure for the respective engine sections 41A-43B and the engine rotors 61-64. The inner nacelle structure 80 is configured to provide an aerodynamic cover over the engine core 46 and its inner case 78. The inner housing structure 28 and its inner nacelle structure 80 may also form a radial inner peripheral boundary of the bypass flowpath 50.

The outer housing structure 30 of FIG. 1 includes an outer case 82 (e.g., a fan case) for the turbine engine 24 and an outer nacelle structure 84. The outer case 82 is disposed radially outboard of, extends axially along and may circumscribe the propulsor section 40 and its propulsor rotor 60. The outer case 82 may thereby house and may be configured as a containment structure for the propulsor section 40 and its propulsor rotor 60. The outer nacelle structure 84 is configured to provide an aerodynamic cover over the outer case 82. The outer housing structure 30 and its outer nacelle structure 84 may also form a radial outer peripheral boundary of the bypass flowpath 50.

During operation of the aircraft propulsion system 22 of FIG. 1, ambient air from an environment 86 external to the aircraft and its aircraft propulsion system 22 enters the aircraft propulsion system 22 and its turbine engine 24 through an airflow inlet 88. This air is propelled by the rotating propulsor rotor 60 in a downstream, aft direction towards the propulsion system aft end 38.

An outer stream of the air propelled by the rotating propulsor rotor 60 is directed into the bypass flowpath 50 through its bypass inlet 56, which air entering the bypass flowpath 50 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 58 to provide forward thrust. This propulsion of the bypass air may account for a majority of the forward thrust generated by the aircraft propulsion system 22 and its turbine engine 24 of FIG. 1.

An inner stream of the air propelled by the rotating propulsor rotor 60 is directed into the core flowpath 48 through its core inlet 52, which air entering the core flowpath 48 may be referred to as "core air". This core air is compressed by the LPC rotor 61 and the HPC rotor 62 and is directed into a combustion chamber 90 (e.g., annular combustion chamber) of a combustor 92 (e.g., annular combustor) in the combustor section 42. Fuel is injected into the combustion chamber 90 by one or more fuel injectors 94 and mixed with the compressed core air to provide a fuel-air mixture. This fuel-air mixture is ignited and combustion products thereof flow through and sequentially drive rotation of the HPT rotor 63 and the LPT rotor 64. The rotation of the HPT rotor 63 and the LPT rotor 64 respectively drive rotation of the HPC rotor 62 and the LPC rotor 61 and, thus, compression of the air received from the core inlet 52. The rotation of the LPT rotor 64 also drives rotation of the propulsor rotor 60 through the RSP drivetrain 74.

Figure 2:
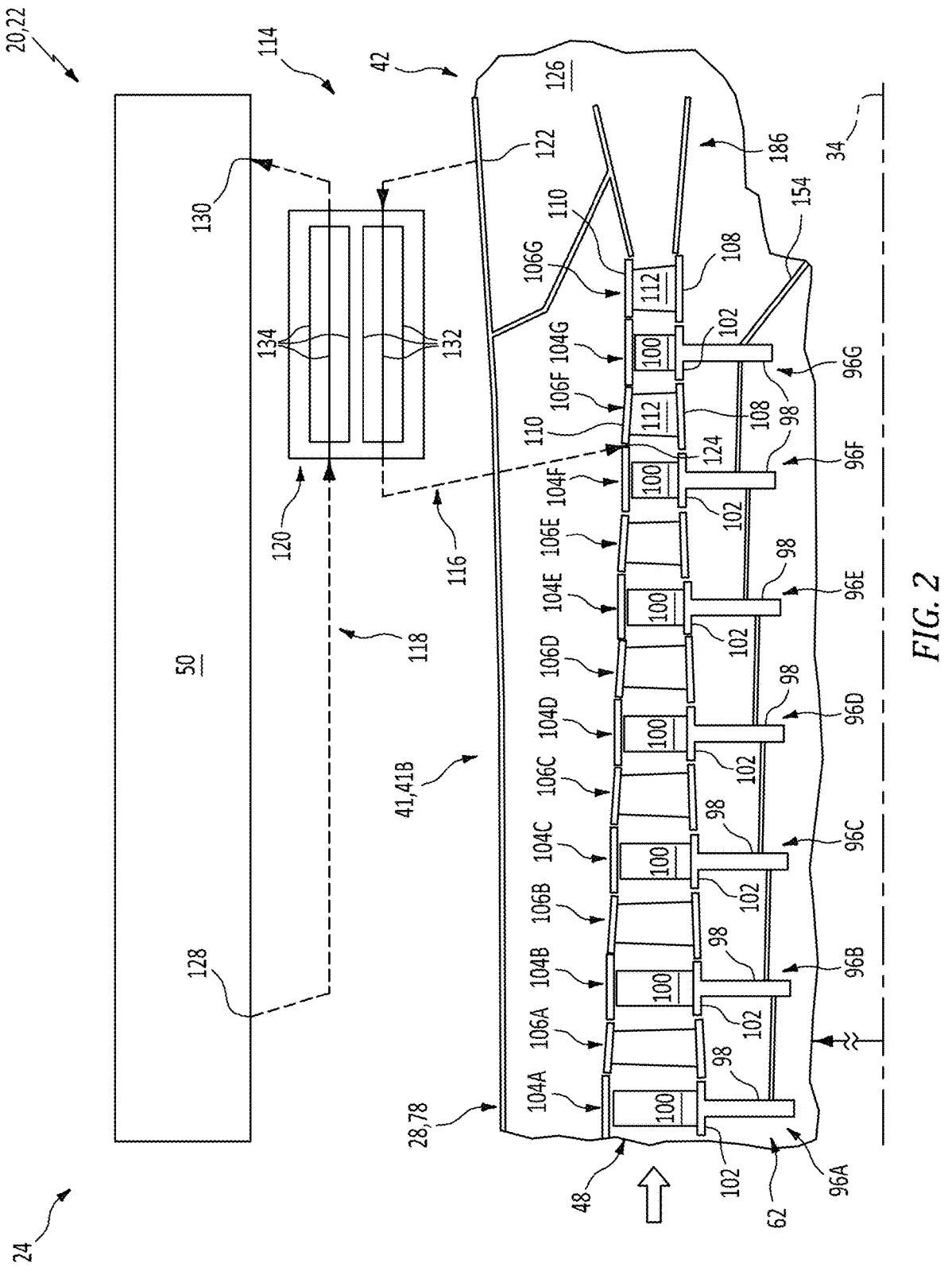
FIG. 2 is a schematic sectional illustration of a portion of the aircraft propulsion system at an air system.

Referring to FIG. 2, the HPC rotor 62 is configured with a plurality of rotor stages 96A-G (generally referred to as "96"). These rotor states 96A-G are sequentially arranged longitudinally along the core flowpath 48. The rotor stage 96A of FIG. 2 is configured as an upstream-most rotor stage of the HPC rotor 62 longitudinally along the core flowpath 48; e.g., the rotor stage fluidly farthest from the combustor section 42. The rotor stage 96G of FIG. 2 is configured as a downstream-most rotor stage of the HPC rotor 62 longitudinally along the core flowpath 48; e.g., the rotor stage fluidly closest to the combustor section 42. The rotor stage 96G of FIG. 2 is also configured as a last rotor stage in the compressor section 41 upstream of the combustor section 42. For case of description, the HPC rotor 62 is described below as including seven (7) of the rotor stages 96. The present disclosure, however, is not limited to such an exemplary number of rotor stages 96. It is contemplated, for example, the HPC rotor 62 may include six (6) or fewer of the rotor stages 96. In another example, it is contemplated the HPC rotor 62 may include eight (8) or more of the rotor stages 96. The specific number of the rotor stages 96 may vary based on, for example, a design pressure ratio across the HPC section 41B.

Each of the rotor stages 96 of FIG. 2 includes a rotor base 98 (e.g., a disk) and a plurality of compressor blades 100. The compressor blades 100 are arranged and may be equis-paced circumferentially around the rotor base 98 and the propulsion system axis 34 in an array; e.g., an annular blade array. Each of the compressor blades 100 is connected to the rotor base 98 at or near a radial outer periphery of the rotor base 98. Each compressor blade 100, for example, may include an attachment (e.g., a root such as a dovetail root or a firtree root) inserted into and mated with a respective receptacle (e.g., slot such as a dovetail slot or a firtree slot) in the rotor base 98 to mechanically attach the respective compressor blade 100 to the rotor base 98. In another example, each compressor blade 100 may be welded or otherwise bonded to the rotor base 98. In still another example, each compressor blade 100 may be formed as an integral part of the rotor base 98. Each compressor blade 100 may be configured as or otherwise includes a compressor blade airfoil.

Each compressor blade 100 and its blade airfoil are disposed radially outboard of and are connected to a platform 102 of the respective rotor stage 96 at a base of the blade airfoil. The platform 102 of FIG. 2 is configured to form a radial inner peripheral boundary of a section of the core flowpath 48 that extends longitudinally across the respective rotor stage 96. A respective circumferential section of the platform 102 may be configured as part of the respective compressor blade 100 where, for example, that compressor blade 100 is mechanically attached to the rotor base 98. Alternatively, the platform 102 may be configured as part of the rotor base 98 where, for example, the compressor blades 100 are bonded to or formed integral with the rotor base 98. The present disclosure, however, is not limited to the foregoing exemplary platform arrangements. Each compressor blade 100 and its blade airfoil project spanwise along a span line of the respective compressor blade 100 and its blade airfoil (e.g., generally radially respective to the propulsion system axis 34) from the platform 102 to a tip of the respective compressor blade 100 and its blade airfoil.

In addition to the HPC rotor 62 with its multiple rotor stages 96, the HPC section 41B of FIG. 2 also includes a plurality of rotor shrouds 104A-G (generally referred to as "104") and a plurality of compressor vane structures 106A-G (generally referred to as "106"). The rotor shrouds 104A-G are sequentially arranged longitudinally along the core flowpath 48. Each of these rotor shrouds 104 may be configured as a blade outer air seal (BOAS) for a respective one of the rotor stages 96 of the HPC rotor 62. Each rotor shroud 104 of FIG. 2, for example, is disposed radially outboard of and next to, but spaced (e.g., slightly) radially outward from, the respective array of the compressor blades 100 and their blade tips. Each rotor shroud 104 extends axially along (e.g., axially overlaps) the respective rotor stage 96 and longitudinally along the core flowpath 48. Each rotor shroud 104 extends circumferentially about (e.g., completely around) the propulsion system axis 34. Each rotor shroud 104 may thereby circumscribe the respective rotor stage 96 of the HPC rotor 62 as well as the core flowpath 48. With this arrangement, a radial inner side of each rotor shroud 104 forms a radial outer peripheral boundary of the section of the core flowpath 48 that extends longitudinally across the respective rotor stage 96.

The vane structures 106A-G are sequentially arranged longitudinally along the core flowpath 48. These vane structures 106 are longitudinally interspersed with the rotor stages 96 and their associated rotor shrouds 104. Each of the vane structures 106A-F of FIG. 2, for example, is located longitudinally next to and between a respective neighboring set of the rotor stages 96. Similarly, each of the rotor stages 96B-G of FIG. 2 is located longitudinally next to and between a respective neighboring set of the vane structures 106. More particularly, each vane structure 106 of FIG. 2 is disposed longitudinally next to and downstream of (along the core flowpath 48) a respective one of the rotor stages 96.

Each of the vane structures 106 of FIG. 2 includes an inner wall 108 (e.g., an inner platform), an outer wall 110 (e.g., an outer platform) and a plurality of compressor vanes 112 (e.g., fixed stator vanes); only some of which are labeled in FIG. 2 for clarity of illustration. The inner wall 108 extends axially along and circumferentially about the propulsion system axis 34. This inner wall 108 is configured to form a radial inner peripheral boundary of a section of the core flowpath 48 that extends longitudinally across the respective vane structure 106. The outer wall 110 is disposed radially outboard of the inner wall 108 and an array of the compressor vanes 112. The outer wall 110 extends axially along and circumferentially about the inner wall 108 and the compressor vane array. This outer wall 110 is configured to form a radial outer peripheral boundary of the section of the core flowpath 48 that extends longitudinally across the respective vane structure 106. The compressor vanes 112 are arranged and may be equispaced circumferentially about the propulsion system axis 34 in the array; e.g., an annular vane array. This array of the compressor vanes 112 defines a respective stage of the compressor vanes 112 longitudinally along the core flowpath 48. Each of the compressor vanes 112 is connected to (e.g., formed integral with or attached to)

the inner wall 108 and the outer wall 110. Each of the compressor vanes 112 projects radially across the respective section of the core flowpath 48. These compressor vanes 112 are configured to condition (e.g., straighten out, turn, etc.) the core air compressed by the respective upstream rotor stage 96 for subsequent use.

During operation of the HPC section 41B of FIG. 2, the HPC rotor 62 rotates about the propulsion system axis 34 to further compress the core air received from the LPC section 41A (see FIG. 1). This compression process heats the core air propelled through the core flowpath 48 in the HPC section 41B thereby subjecting various components along the core flowpath 48 in the HPC section 41B to elevated temperatures, particularly along later rotor stages (e.g., 86D-G or 96F-G). As turbine engines are continuously designed and/or tuned for further efficiency and/or to produce additional power, the core air temperatures may rise to values which may negatively affect component performance and/or durability. The aircraft propulsion system 22 of FIG. 2 therefore include an air system 114 for the turbine engine 24 and its HPC section 41B. This air system 114 is configured to direct cooled air into the core flowpath 48 along the HPC section 41B, for example to reduce an average temperature of the core air propelled through the core flowpath 48 in the HPC section 41B. The air system 114 of FIG. 2 includes a core air circuit 116, a bypass air circuit 118 (or another working fluid circuit) and a heat exchanger 120.

The core air circuit 116 extends longitudinally from an airflow inlet 122 into the core air circuit 116 ("core circuit inlet") to an airflow outlet 124 from the core air circuit 116 ("core circuit outlet"). More particularly, the core air circuit 116 extends longitudinally from the core circuit inlet 122, through the heat exchanger 120, to the core circuit outlet 124.

Figure 3:
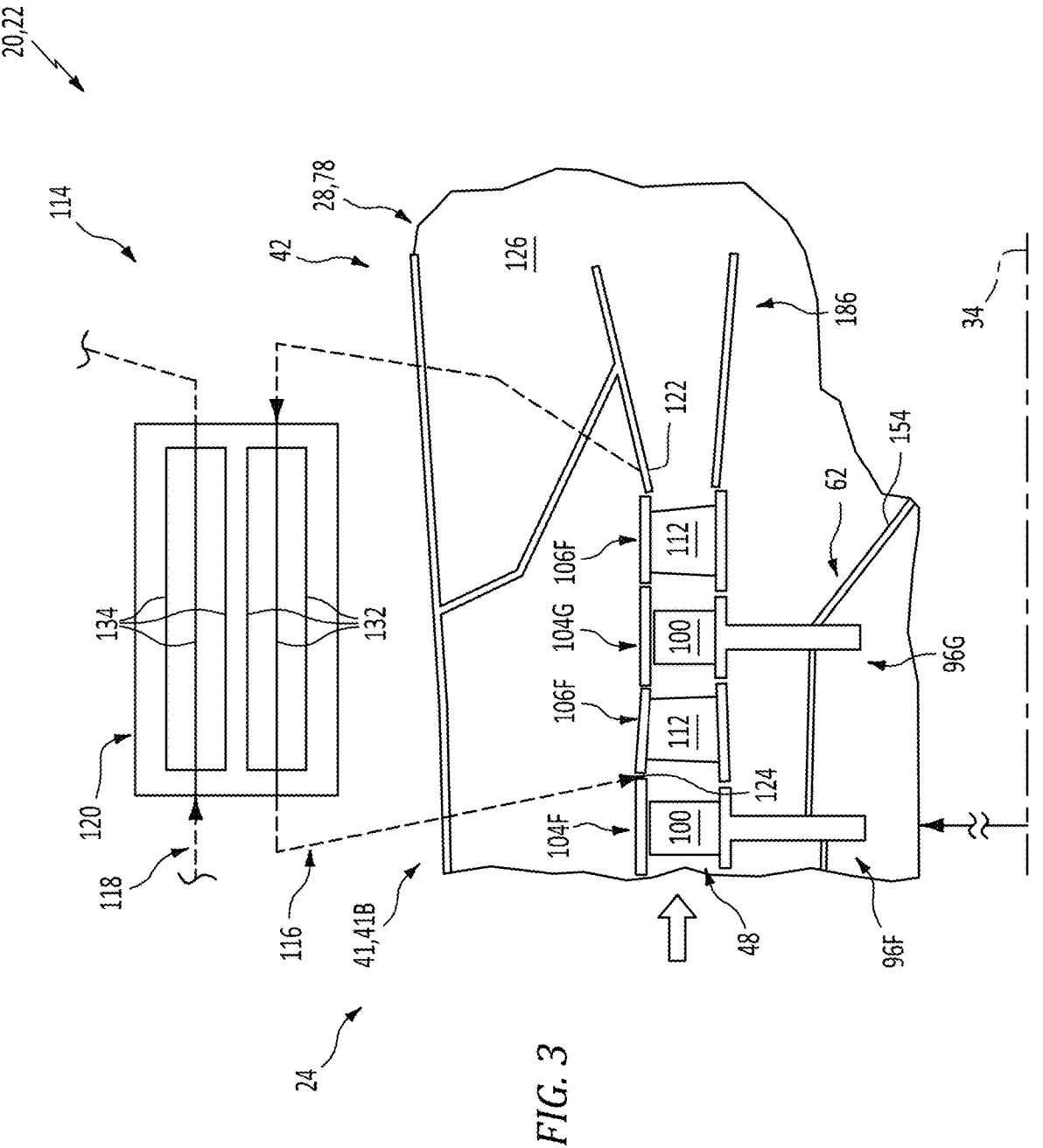
FIG. 3 is a schematic sectional illustration of a portion of the aircraft propulsion system at the air system with another air circuit inlet location.

The core circuit inlet 122 is fluidly coupled to the core flowpath 48 at an inlet location. This inlet location is disposed longitudinally along the core flowpath 48 upstream of the combustor 92 and its combustion chamber 90 (see FIG. 1). The inlet location, for example, may be disposed longitudinally along the core flowpath 48 between the (e.g., last) rotor stage 96G of the HPC rotor 62 and the combustor 92 (see FIG. 1). More particularly, the inlet location of FIG. 2 is disposed along a diffuser plenum 126 in the combustor section 42, where the diffuser plenum 126 is a section of the core flowpath 48 surrounding the combustor 92 (see FIG. 1). With this arrangement, the core circuit inlet 122 fluidly couples the core air circuit 116 to the diffuser plenum 126. The core circuit inlet 122 may be configured as or otherwise include a scoop (or multiple scoops) and/or a bleed port (or multiple bleed ports) in and/or along a peripheral boundary of the respective section of the core flowpath 48; e.g., the diffuser plenum 126 of FIG. 2. The present disclosure, however, is not limited to such an exemplary arrangement. For example, referring to FIG. 3, the core circuit inlet 122 and its inlet location may alternatively be disposed along a section of the core flowpath 48 upstream of the diffuser plenum 126. The core circuit inlet 122, for example, may be arranged at (e.g., on, adjacent or proximate) a downstream end of the HPC rotor 62.

Referring to FIG. 2, the core circuit outlet 124 is fluidly coupled to the core flowpath 48 at an outlet location. This outlet location is disposed longitudinally along the core flowpath 48 upstream of the inlet location in the HPC section 41B. The outlet location, for example, may be disposed longitudinally along the HPC rotor 62 at or downstream of the rotor stage 96D. Here, the rotor stage 96D is configured as a fourth (4th) to last of the rotor stages 96 of the HPC rotor 62. More particularly, the outlet location may be disposed longitudinally along the HPC rotor 62 at or downstream of the rotor stage 96F. Here, the rotor stage 96F is configured as a second (2nd) to last of the rotor stages 96 of the HPC rotor 62. With this arrangement, the core circuit outlet 124 fluidly couples the core air circuit 116 to a section of the core flowpath 48 along the HPC rotor 62. The core circuit outlet 124 may be configured as or otherwise include an outlet nozzle (or multiple outlet nozzles) and/or an outlet port (or multiple outlet ports) in and/or along the outer peripheral boundary of the respective section of the core flowpath 48.

The bypass air circuit 118 extends longitudinally from an airflow inlet 128 into the bypass air circuit 118 ("bypass circuit inlet") to an airflow outlet 130 from the bypass air circuit 118 ("bypass circuit outlet"). More particularly, the bypass air circuit 118 extends longitudinally from the bypass circuit inlet 128, through the heat exchanger 120, to the bypass circuit outlet 130. The bypass circuit inlet 128 is fluidly coupled to the bypass flowpath 50 (see also FIG. 1), and thereby fluidly couples the bypass air circuit 118 to the bypass flowpath 50. The bypass circuit inlet 128 may be configured as or otherwise include a scoop (or multiple scoops) and/or a bleed port (or multiple bleed ports) in and/or along the bypass flowpath 50. Similarly, the bypass circuit outlet 130 is fluidly coupled to the bypass flowpath 50 (see also FIG. 1), and thereby fluidly couples the bypass air circuit 118 to the bypass flowpath 50. The bypass circuit outlet 130 may be configured as or otherwise include an outlet nozzle (or multiple outlet nozzles) and/or an outlet port (or multiple outlet ports) in and/or along the bypass flowpath 50. The present disclosure, however, is not limited to such an exemplary arrangement. For example, it is contemplated the bypass circuit outlet 130 may alternatively be fluidly coupled to another internal volume (e.g., flowpath, compartment, etc.) within the aircraft propulsion system 22. Moreover, the circuit inlet 128 may alternatively be fluidly coupled to another pressurized air source; e.g., another flowpath, etc.

The heat exchanger 120 of FIG. 2 includes one or more internal core circuit passages 132 and one or more internal bypass circuit passages 134. Each of these circuit passages 132, 134 may be partially or completely formed by the heat exchanger 120. The core circuit passages 132 may form at least a section of or may otherwise be fluidly coupled inline with the core air circuit 116. The bypass circuit passages 134 may form at least a section of or may otherwise be fluidly coupled inline with the bypass air circuit 118. The bypass circuit passages 134 are fluidly independent from the core circuit passages 132. The core circuit passages 132 and the bypass circuit passages 134 may be arranged to configure the heat exchanger 120 as a crossflow heat exchanger, a counterflow heat exchanger, a parallel flow heat exchanger, or a hybrid heat exchanger with a combination crossflow, counterflow and/or parallel flow arrangement. The heat exchanger 120 of FIG. 2 is configured as an air-to-air heat exchanger.

During operation of the air system 114 of FIG. 2, a portion of the compressed core air is bled from the core flowpath 48 and its diffuser plenum 126 and directed into the core air circuit 116 through the core circuit inlet 122. This bleed core air is directed into the core circuit passages 132 of the heat exchanger 120 by the core air circuit 116. Simultaneously, a portion of the bypass air is bled from the bypass flowpath 50 and directed into the bypass air circuit 118 through the bypass circuit inlet 128. This bleed bypass air is directed into the bypass circuit passages 134 of the heat exchanger 120 by the bypass air circuit 118. Within the heat exchanger 120, heat energy carried by the bleed core air entering the heat exchanger 120 is transferred from the bleed core air into the bleed bypass air. The heat exchanger 120 thereby cools the bleed core air to provide the cooled air and heats the bleed bypass air to provide heated air. The cooled air is directed through the core air circuit 116 to the core circuit outlet 124, where the cooled air is exhausted from the core air circuit 116 into the core flowpath 48. By introducing the cooled air into the core flowpath 48, the air system 114 may facilitate a reduction in the average temperature of the core air flowing in the core flowpath 48 in the HPC section 41B downstream of the outlet location. Simultaneously, the heated air is directed through the bypass air circuit 118 to the bypass circuit outlet 130, where the heated air is exhausted from the bypass air circuit 118 into the bypass flowpath 50. By directing the heated air into the bypass flowpath 50, the air system 114 may facilitate at least some thrust recuperation.

Figure 4:
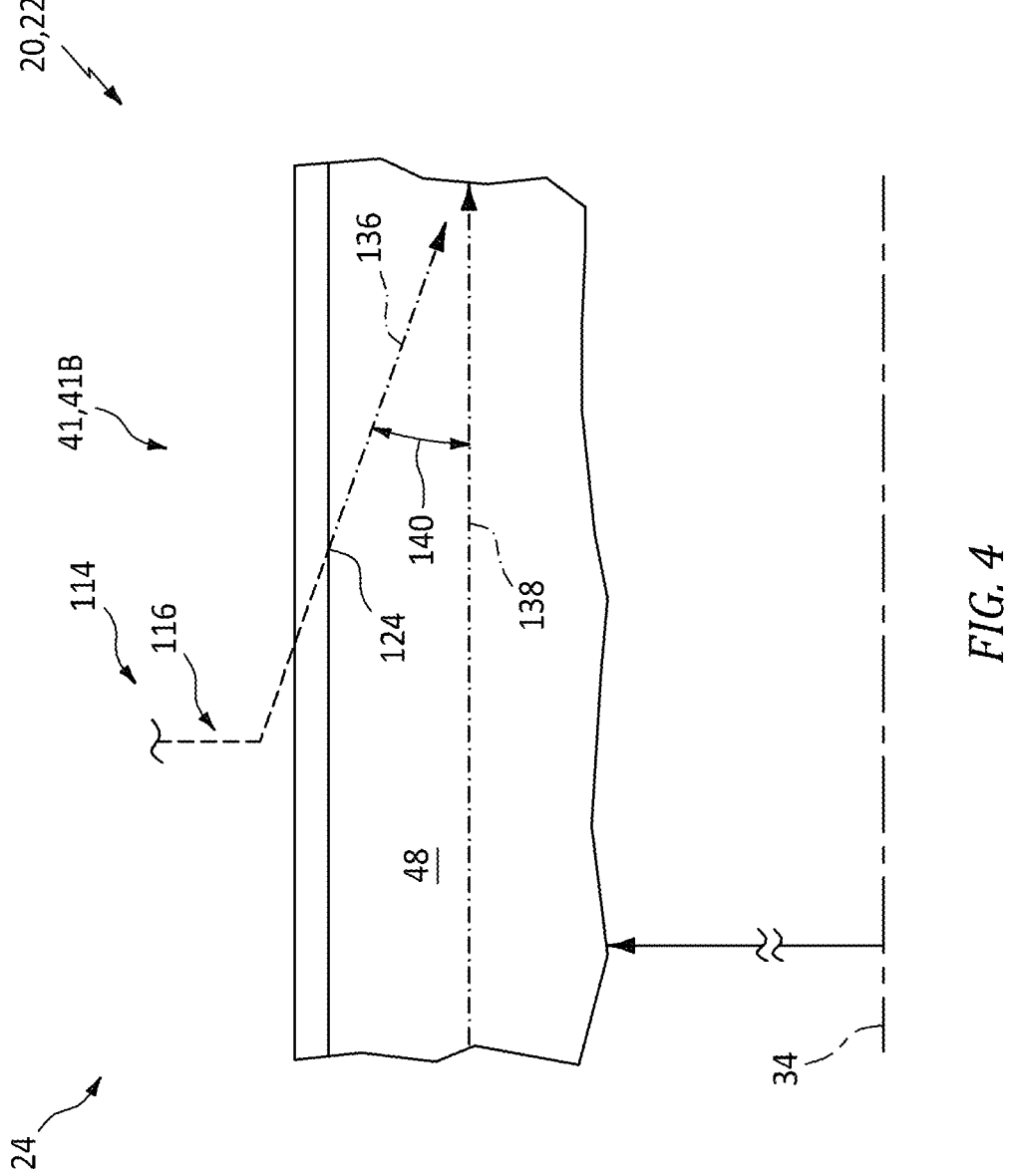
FIG. 4 is a schematic illustration depicting a cooled air trajectory relative to a core air trajectory.

Referring to FIG. 4, the air system 114 and its core air circuit 116 are configured to direct the cooled air into the core flowpath 48 along a cooled air trajectory 136. The cooled air trajectory 136 of FIG. 4 includes an axial component and a radial component. The axial component points in a common (the same) axial direction along the propulsion system axis 34 as the flow of the core air through the core flowpath 48 at the outlet location. The radial component points in a radial inward direction towards the propulsion system axis 34. The cooled air trajectory 136 of FIG. 4 is thereby angularly offset from a trajectory 138 of the core flowpath 48 by an offset angle 140. This offset angle 140 is an acute angle equal to or less than, for example, forty-five degrees (45°). More particularly, the offset angle 140 may be equal to or less than thirty-five degrees (35°) or twenty-five degrees (25°). With such an arrangement, the cooled air may be directed into the core flowpath 48 in a direction that substantially matches the flow of the core air in the core flowpath 48. This may reduce flow disturbances to the core air in the core flowpath 48 and thereby mitigate losses in efficiency and/or potential for unintended heating of the core air due to changes in flow velocity. The present disclosure, however, is not limited to such an exemplary cooled air trajectory. For example, it is contemplated a nozzle may be provided such that the cooled air trajectory 136 is alternatively parallel with the core air trajectory. It is also contemplated the cooled air trajectory 136 may also include a circumferential component to generally align with or otherwise match any circumferential swirl of the core air about the propulsion system axis 34 in the core flowpath 48.

Figure 5A:
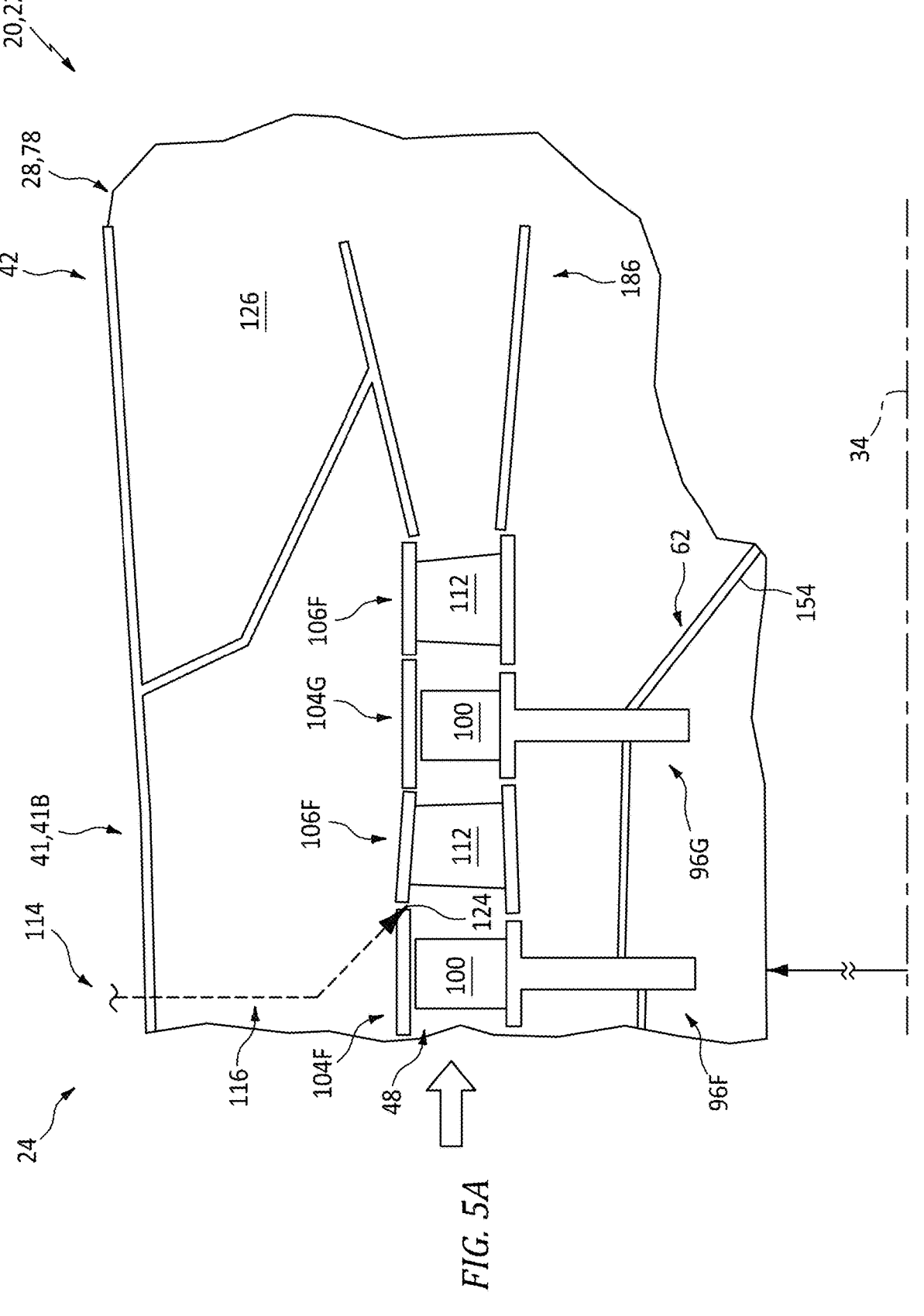
FIGS. 5A and 5B are schematic sectional illustrations of a portion of the aircraft propulsion system at the air system with various air circuit outlet locations.
Figure 5B:
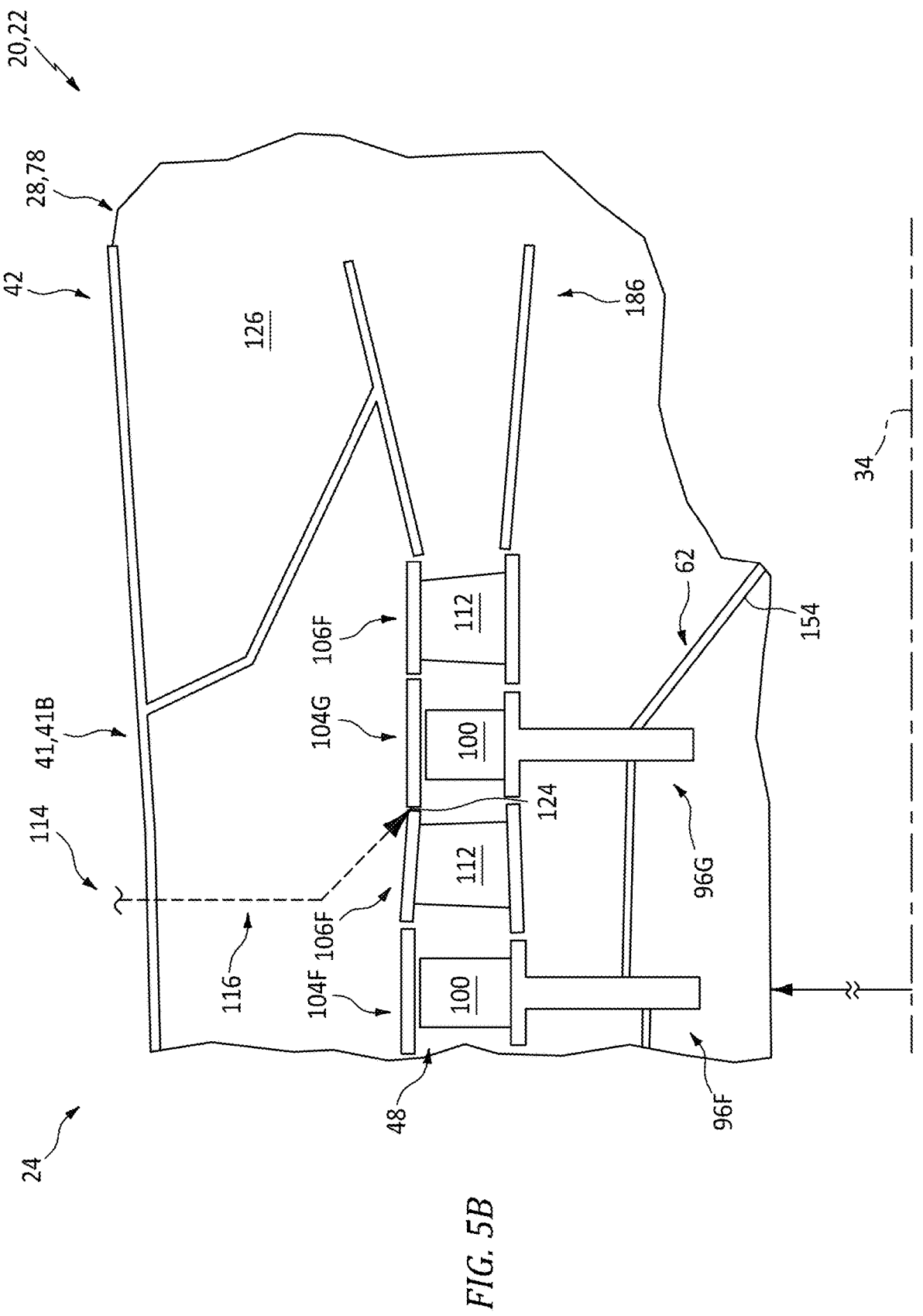

In some embodiments, referring to FIGS. 5A and 5B, the core circuit outlet 124 and its outlet location may be disposed longitudinally between a neighboring arrays of the compressor blades 100 and the compressor vanes 112. For example, referring to FIG. 5A, the core circuit outlet 124 is disposed longitudinally along the outer peripheral boundary of the core flowpath 48 between the rotor stage 96F and the vane structure 106F. Here, the core circuit outlet 124 is disposed downstream of the rotor stage 96F and its compressor blades 100, and upstream of the vane structure 106F and its compressor vanes 112. In another example, referring to FIG. 5B, the core circuit outlet 124 is disposed longitudinally along the outer peripheral boundary of the core flowpath 48 between the vane structure 106F and the rotor stage 96G. Here, the core circuit outlet 124 is disposed downstream of the vane structure 106F and its compressor vanes 112, and upstream of the rotor stage 96G and its compressor blades 100.

Figure 6:
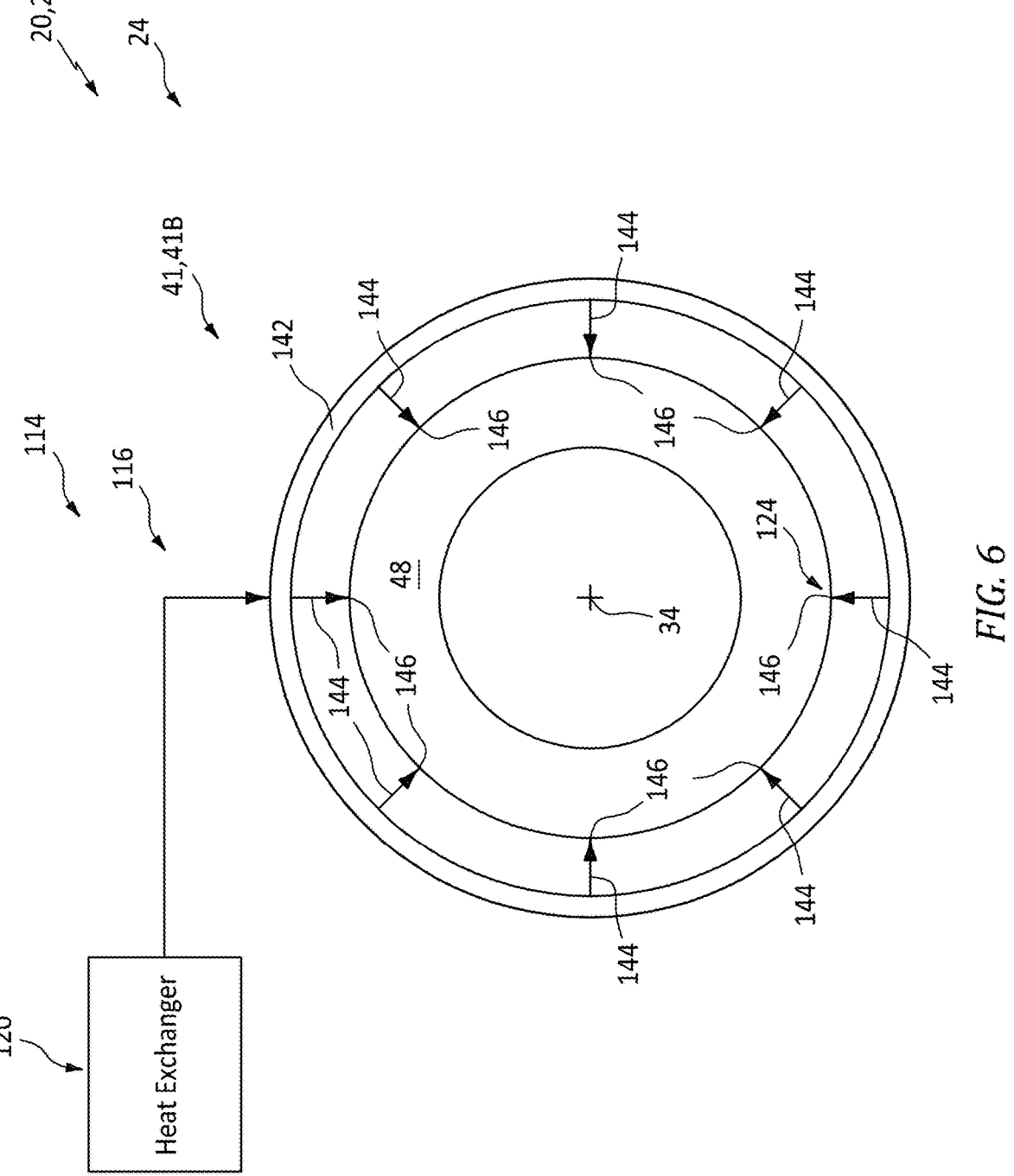
FIG. 6 is a schematic illustration of a portion of the aircraft propulsion system at the air system with a manifold feeding an array of outlet legs.

In some embodiments, referring to FIG. 6, the core air circuit 116 may include an air manifold 142 and a plurality of outlet legs 144 fluidly coupled in series between the heat exchanger 120 and the core flowpath 48. The air manifold 142 is configured to receive the cooled air from the heat exchanger 120 and (e.g., equally) distribute that cooled air to the outlet legs 144. The air manifold 142 is located radially outboard of the core flowpath 48. This air manifold 142 extends circumferentially about (e.g., completely around) the propulsion system axis 34, providing the air manifold 142 with a full-hoop (e.g., annular) geometry. The outlet legs 144 are arranged and may be equispaced circumferentially about the core flowpath 48 and the propulsion system axis 34 in an array; e.g., an annular outlet leg array. Each of these outlet legs 144 projects out from the air manifold 142 to a respective outlet orifice 146; e.g., a circumferentially elongated slot. Here, the outlet orifices 146 may collectively form the core circuit outlet 124.

While the air system 114 is described above as introducing the cooled air from the core air circuit 116 back into the core flowpath 48, the present disclosure is not limited to such arrangements. The air system 114, for example, may also or alternatively direct some or all of the cooled air to one or more other regions of the turbine engine 24. For example, referring to FIG. 7, the air system 114 may use the cooled air to cool a portion of the high speed rotating structure 68 axially aft of the (e.g., last) rotor stage 96G of the HPC rotor 62.

Figure 7:
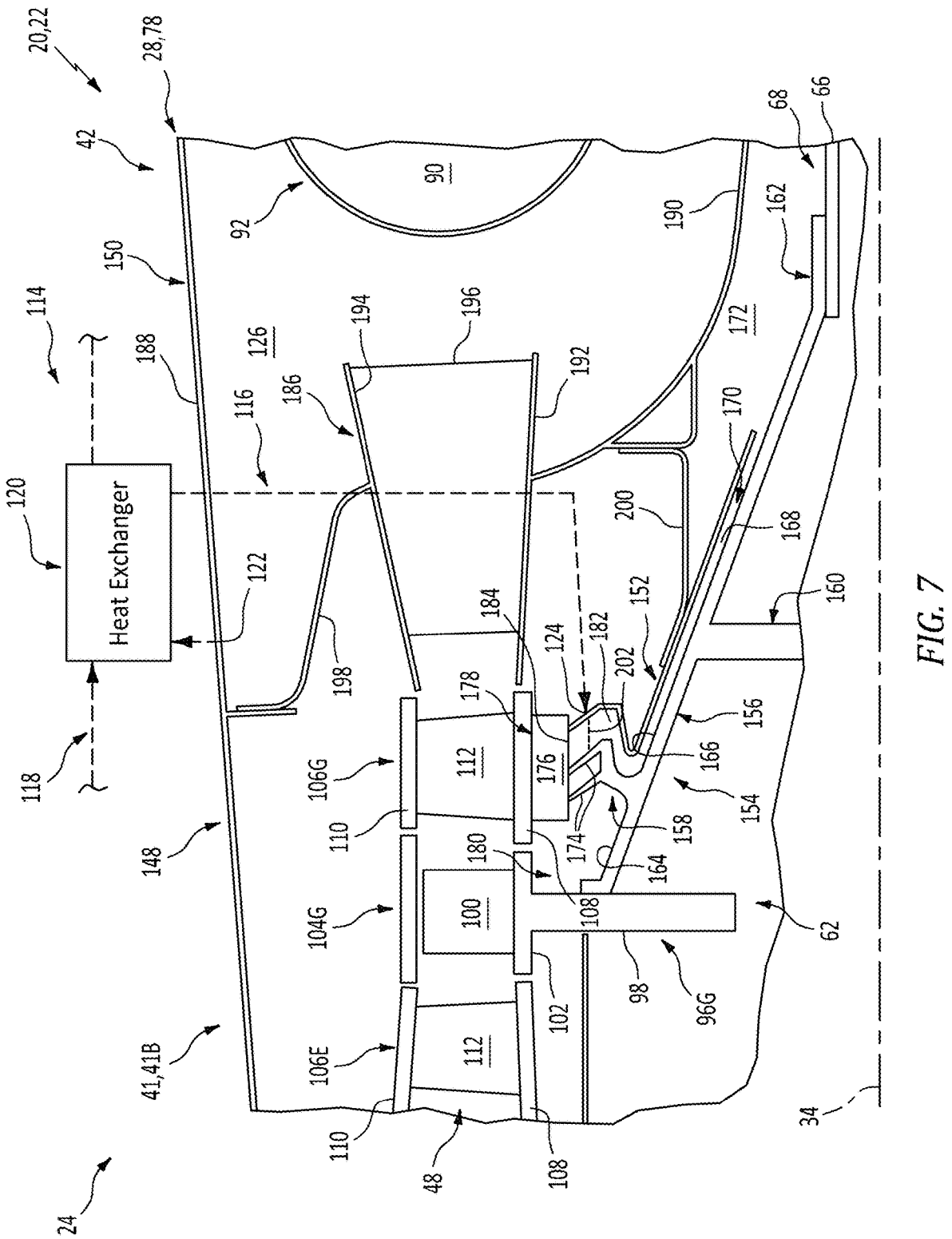
FIG. 7 is a schematic illustration of a portion of the aircraft propulsion system at the air system with another air circuit outlet location.

FIG. 7 partially illustrates the HPC rotor 62 with a stationary structure 148 of the turbine engine 24. The engine structure 148 of FIG. 7 includes the inner case 78, the combustor 92, the rotor shrouds 104 and the vane structures 106 (see also FIGS. 1 and 2). This engine structure 148 also includes a diffuser structure 150 and a baffle wall 152.

The HPC rotor 62 of FIG. 7 includes a compressor rotor hub 154 in addition to its rotor stages 96 (see also FIG. 2). This rotor hub 154 is configured to couple the HPC rotor 62 and its rotor stages 96 to the high speed shaft 66 (see also FIG. 1). The rotor hub 154 of FIG. 7 includes a hub wall 156 and a seal element 158. The rotor hub 154 may also include a rotor disk 160 connected to (e.g., formed integral with or attached to) the hub wall 156 at a radial inner side of the hub wall 156. Each of these rotor hub members 156, 158 and 160 extends circumferentially around the propulsion system axis 34 providing the rotor hub 154 and its members 156, 158 and 160 with full-hoop (e.g., tubular and/or annular) geometries.

The rotor hub 154 and its hub wall 156 may be mechanically fastened, bonded and/or otherwise attached to the (e.g., last) rotor stage 96G and its rotor base 98, for example radially inboard of the platform 102 of the rotor stage 96G. The hub wall 156 projects out (in an axially aft and radially inward direction) from the rotor base 98 of the (e.g., last) rotor stage 96G to a coupling 162 with the high speed shaft 66. The hub wall 156 of FIG. 7 includes a forward outer surface 164 and an aft outer surface 166 to opposing axial sides of the seal element 158. The forward outer surface 164 may extend from the rotor base 98 of the (e.g., last) rotor stage 96G to the forward side of the seal element 158. The aft outer surface 166 may extend from the aft side of the seal element 158 to (or about) the coupling 162 with the high speed shaft 66. Each of these outer surfaces 164 and 166 tapers radially inward towards the propulsion system axis 34 as the rotor hub 154 and its hub wall 156 project axially along the propulsion system axis 34 away from the (e.g., last) rotor stage 96G and its rotor base 98. With this arrangement, the rotor hub 154 in general and, more particularly, the hub wall 156 may have a frustoconical geometry. In addition, the aft outer surface 166 of FIG. 7 forms a radial inner peripheral boundary of a downstream section 168 of an internal air passage 170 that leads to an air cavity 172 bordering the diffuser structure 150.

The seal element 158 is connected to (e.g., formed integral with or attached to) the hub wall 156 at a radial outer side of the hub wall 156. This seal element 158 projects radially out from the hub wall 156 to a distal outer end of the seal element 158. At this element outer end, the seal element 158 of FIG. 7 includes one or more knife-edge seal protrusions 174. These knife-edge seal protrusions 174 are configured to collectively form a seal with a seal land 176 arranged with and coupled to the inner wall 108 of the (e.g., last) vane structure 106G. A seal assembly 178 of the seal element 158 and the seal land 176 may thereby reduce or prevent air leakage from a cavity 180 forward of the seal element 158 to the air passage 170 aft of the seal element 158. In addition, the seal element 158 of FIG. 7 forms an axial forward peripheral boundary of an upstream section 182 of the air passage 170. Briefly, the seal land 176 of FIG. 7 is nested within a bore of the inner wall 108 of the (e.g., last) vane structure 106G, and may be configured as part of or mounted to the vane structure 106G. Here, the seal land 176 of FIG. 7 forms a distal upstream end 184 of the air passage 170 and its upstream section 182.

The diffuser structure 150 includes a diffuser nozzle 186, an outer diffuser casing 188 and an inner diffuser casing 190. This diffuser structure 150 is configured to form outer boundaries of the diffuser plenum 126. The diffuser structure 150 is also configured to direct the core air compressed by the HPC section 41B into the diffuser plenum 126.

The diffuser nozzle 186 of FIG. 7 is disposed next to the (e.g., last) vane structure 106G longitudinally along the core flowpath 48. The diffuser nozzle 186 of FIG. 7 includes an inner nozzle wall 192, an outer nozzle wall 194 and one or more nozzle struts 196. The inner nozzle wall 192 projects longitudinally along the core flowpath 48 away from the inner wall 108 of the (e.g., last) vane structure 106G and into (or to) the diffuser plenum 126. The inner nozzle wall 192 extends circumferentially about the propulsion system axis 34. This inner nozzle wall 192 is configured to form a radial inner peripheral boundary of a section of the core flowpath 48 that extends longitudinally across the diffuser nozzle 186. The outer nozzle wall 194 is disposed radially outboard of the inner nozzle wall 192 and an array of the nozzle struts 196. The outer nozzle wall 194 projects longitudinally along the core flowpath 48 away from the outer wall 110 of the (e.g., last) vane structure 106G and into (or to) the diffuser plenum 126. The outer nozzle wall 194 extends circumferentially about the propulsion system axis 34. This outer nozzle wall 194 is configured to form a radial outer peripheral boundary of the section of the core flowpath 48 that extends longitudinally across the diffuser nozzle 186. Here, the nozzle walls 192 and 194 radially diverge away from one another as the diffuser nozzle 186 and its nozzle walls 192 and 194 project axially along the propulsion system axis 34 away from the (e.g., last) vane structure 106G. The nozzle struts 196 are arranged and may be equispaced circumferentially about the propulsion system axis 34 in the array; e.g., an annular strut array. Each of the nozzle struts 196 is connected to (e.g., formed integral with or attached to) the inner nozzle wall 192 and the outer nozzle wall 194. Each of the nozzle struts 196 projects radially across the respective section of the core flowpath 48 from the inner nozzle wall 192 to the outer nozzle wall 194.

The outer diffuser casing 188 may be configured as an axial segment of the inner case 78. The outer diffuser casing 188 is disposed radially outboard of the diffuser nozzle 186, the inner diffuser casing 190 and the combustor 92. The outer diffuser casing 188 extends axially along the propulsion system axis 34 and may axially overlap the (e.g., last) vane structure 106G, the diffuser nozzle 186 and the rotor hub 154. The outer diffuser casing 188 extends circumferentially around the propulsion system axis 34 providing the outer diffuser casing 188 with a full-hoop (e.g., tubular) geometry. This outer diffuser casing 188 is configured to form a radial outer peripheral boundary of the diffuser plenum 126. Here, a bulkhead wall 198 may extend radially between and is connected to (a) the diffuser nozzle 186 and its outer nozzle wall 194 and (b) the outer diffuser casing 188. This bulkhead wall 198 is configured to form an axial forward peripheral boundary of the diffuser plenum 126.

The inner diffuser casing 190 is disposed radially inboard of the diffuser nozzle 186, the outer diffuser casing 188 and the combustor 92. The inner diffuser casing 190 extends axially along the propulsion system axis 34 and may axially overlap the rotor hub 154. The inner diffuser casing 190 extends circumferentially around the propulsion system axis 34 providing the inner diffuser casing 190 with a full-hoop (e.g., tubular) geometry. This inner diffuser casing 190 is configured to form a radial inner peripheral boundary of the diffuser plenum 126. The inner diffuser casing 190 is also configured to form a radial outer peripheral boundary of the air cavity 172. Here, an axial forward end of the inner diffuser casing 190 is connected to the diffuser nozzle 186 and its inner nozzle wall 192.

The baffle wall 152 is disposed radially between (a) the diffuser structure 150 and its inner diffuser casing 190 and (b) the HPC rotor 62 and its rotor hub 154. The baffle wall 152 of FIG. 7 is mounted to the diffuser structure 150 and its inner diffuser casing 190 by a baffle mount 200. The baffle wall 152 is disposed in close proximity to the rotor hub 154 and its members 156 and 158. This baffle wall 152 of FIG. 7 also follows a geometric contour of the rotor hub 154 and its members 156 and 158. The baffle wall 152 is configured to form an axial aft peripheral boundary of the upstream section 182 of the air passage 170 and a radial outer peripheral boundary of the downstream section 168 of the air passage 170. This baffle wall 152 is also configured to form a radial inner peripheral boundary of an axial forward portion of the air cavity 172.

The air system 114 of FIG. 7 may be configured similarly as described above. The core air circuit 116 of FIG. 7, however, is routed radially across the core flowpath 48 and the core circuit outlet 124 is fluidly coupled to the air passage 170. More particularly, the core circuit outlet 124 is fluidly coupled to the upstream section 182 of the air passage 170 at (or about) the upstream end 184 of the air passage 170 and its upstream section 182. With this arrangement, the air system 114 and its core air circuit 116 are configured to direct the cooled air received from the heat exchanger 120 into the upstream section 182 of the air passage 170. The cooled air may flow from the upstream section 182 of the air passage 170 into the downstream section 168 of the air passage 170, where the cooled air flows along the rotor hub 154 and its hub wall 156 (e.g., along the aft outer surface 166 of the hub wall 156) before entering the air cavity 172. As the cooled air flows along the hub wall 156 and its aft outer surface 166, the cooled air may convectively cool the hub wall 156 and its aft outer surface 166. The cooled air may then be routed to one or more other engine components downstream from the air cavity 172 for further cooling, buffering, venting and/or otherwise. In addition to cooling the hub wall 156 and its aft outer surface 166, the cooled air may also be directed along a forward axial trajectory 202 out of the core circuit outlet 124 into the upstream section 182 of the air passage 170 to impinge against and/or otherwise blanket the seal element 158 with the cooled air to cool that seal element 158. Introducing the cooled air at the upstream end 184 of the air passage 170 may also reduce a pressure drop across the seal assembly 178 and thereby further reduce leakage across the seal assembly 178 from the cavity 180.

While the turbine engine 24 of FIG. 1 is described above with a particular two rotating structure arrangement (e.g., a two-spool architecture), the present disclosure is not limited thereto. For example, the LPC rotor 61 may be omitted to configure the LPT rotor 64 as a power turbine (PT) rotor for the propulsor rotor 60. The turbine engine 24 may also or alternatively include another rotating structure with a bladed compressor rotor in the compressor section 41 and a bladed turbine rotor in the turbine section 43; e.g., an intermediate speed spool for the engine core 46.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
a compressor rotor configured to rotate about an axis, the compressor rotor including a rotor stage and a rotor hub, the rotor stage including a rotor base and a plurality of compressor blades connected to the rotor base, the plurality of compressor blades arranged circumferentially about the rotor base in a compressor blade array, the rotor hub comprising a hub wall connected to the rotor base, an outer surface of the hub wall tapering radially inward towards the axis as the hub wall projects axially away from the rotor base, the outer surface of the hub wall forming an inner peripheral boundary of at least a first section of an air passage, and a seal element projecting radially out from the hub wall;
a compressor vane structure axially next to the rotor stage and radially outboard of the hub wall, the compressor vane structure comprising a seal land and a plurality of compressor vanes arranged circumferentially about the axis in a compressor vane array, the seal land configured to form a seal with the seal element, and the seal element forming an axial boundary of a second section of the air passage upstream of the first section of the air passage;
a diffuser structure including a diffuser nozzle and a diffuser plenum, the diffuser nozzle radially outboard of the hub wall and the air passage;
a combustor disposed in the diffuser plenum;
a core flowpath extending longitudinally across the plurality of compressor blades and through the compressor vane structure, the diffuser nozzle and the diffuser plenum into the combustor; and
an air system including an air circuit and a heat exchanger, the air circuit extending longitudinally from a circuit inlet through the heat exchanger to a circuit outlet, and the air system configured to bleed compressed air from the diffuser plenum through the circuit inlet, cool the compressed air with the heat exchanger to provide cooled air, and direct the cooled air into the air passage through the circuit outlet.

2. The assembly of claim 1, wherein the air system is configured to direct the cooled air into the second section of the air passage through the circuit outlet.

3. The assembly of claim 1, wherein the air system is configured to direct the cooled air into the second section of the air passage through the circuit outlet to impinge against the seal element.

4. The assembly of claim 1, wherein the air system is configured to direct the cooled air into the second section of the air passage through the circuit outlet, and the second section of the air passage is radially outboard of the first section of the air passage.

5. The assembly of claim 1, wherein the air system is configured to direct the cooled air into the second section of the air passage through the circuit outlet, and the second section of the air passage is radially inboard of and partially formed by the compressor vane structure.

6. The assembly of claim 1, wherein the air system is configured to direct the cooled air along an axial trajectory through the circuit outlet into the air passage.

7. The assembly of claim 1, further comprising a baffle wall mounted to the diffuser structure, the baffle wall following a contour of the rotor hub and forming an outer peripheral boundary of at least the first section of the air passage.

8. The assembly of claim 7, wherein an air cavity is disposed between the baffle wall and the diffuser structure.

9. The assembly of claim 1, wherein the rotor stage is a last compressor rotor stage upstream of the diffuser structure along the core flowpath.

10. The assembly of claim 1, wherein the diffuser nozzle is axially next to the compressor vane structure.

11. The assembly of claim 1, wherein
the diffuser nozzle includes an inner nozzle wall and an outer nozzle wall; and
the inner nozzle wall and the outer nozzle wall radially diverge away from one another as the inner nozzle wall and the outer nozzle wall project axially away from the compressor vane structure.

12. The assembly of claim 11, wherein
the diffuser nozzle further includes a plurality of struts arranged circumferentially about the axis in a strut array; and
each of the plurality of struts projects radially across the core flowpath from the inner nozzle wall to the outer nozzle wall.

13. The assembly of claim 1, further comprising:
a rotating structure configured to rotate about the axis;
the rotating structure including the compressor rotor and a turbine rotor; and
the combustor disposed axially along the axis between the compressor rotor and the turbine rotor.

14. The powerplant of claim 1, wherein the heat exchanger comprises an air-to-air heat exchanger.

15. The powerplant of claim 1, further comprising:
a compressor section including the compressor rotor and the compressor vane structure;
a combustor section including the diffuser structure and the combustor;
a turbine section; and
a bypass flowpath bypassing the compressor section, the combustor section and the turbine section;

the heat exchanger configured to receive bypass air bled from the bypass flowpath.

16. The powerplant of claim 1, further comprising:

a compressor section including the compressor rotor and the compressor vane structure;

a combustor section including the diffuser structure and the combustor;

a turbine section; and a bypass flowpath bypassing the compressor section, the combustor section and the turbine section;

the air system further including a second air circuit, the second air circuit extending longitudinally from a second circuit inlet through the heat exchanger to a second circuit outlet, the second circuit inlet fluidly coupling the second air circuit to the bypass flowpath, and the second circuit outlet fluidly coupling the second air circuit to the bypass flowpath.

17. An assembly for an aircraft powerplant, comprising:

a compressor rotor configured to rotate about an axis, the compressor rotor including a rotor stage and a rotor hub, the rotor stage including a rotor base and a plurality of compressor blades connected to the rotor base, the plurality of compressor blades arranged circumferentially about the rotor base in a compressor blade array, the rotor hub including a seal element and a hub wall connected to the rotor base, the hub wall tapering radially inward towards the axis as the hub wall projects axially away from the rotor base, the seal element projecting radially out from the hub wall, and the rotor hub forming a peripheral boundary of an air passage;

a compressor vane structure axially next to the rotor stage and radially outboard of the hub wall, the compressor vane structure comprising a seal land and a plurality of compressor vanes arranged circumferentially about the axis in a compressor vane array, the seal land radially outboard of and configured to form a seal with the seal element;

a core flowpath extending longitudinally across the plurality of compressor blades and through the compressor vane structure; and an air system including an air circuit and a heat exchanger, the air circuit extending longitudinally from a circuit inlet through the heat exchanger to a circuit outlet, and the air system configured to bleed compressed air from the core flowpath downstream of the rotor stage through the circuit inlet, cool the compressed air with the heat exchanger to provide cooled air, and direct the cooled air into the air passage through the circuit outlet in an axial direction towards the seal element.

18. The assembly of claim 17, further comprising:

a diffuser structure including a diffuser nozzle and a diffuser plenum, the diffuser nozzle radially outboard of the hub wall; and a combustor disposed in the diffuser plenum;

the core flowpath extending longitudinally from the compressor vane structure through the diffuser nozzle and the diffuser plenum into the combustor; and the circuit inlet fluidly coupled to the diffuser plenum.

19. An assembly for an aircraft powerplant, comprising:

a compressor rotor configured to rotate about an axis, the compressor rotor including a rotor stage and a rotor hub, the rotor stage including a rotor base and a plurality of compressor blades connected to the rotor base, the plurality of compressor blades arranged circumferentially about the rotor base in a compressor blade array, the rotor hub comprising a hub wall connected to the rotor base, the hub wall tapering radially inward towards the axis as the hub wall projects axially away from the rotor base, and the hub wall forming an inner peripheral boundary of at least a first section of an air passage;

a compressor vane structure axially next to the rotor stage and radially outboard of the hub wall;

a diffuser structure including a diffuser nozzle and a diffuser plenum, the diffuser nozzle radially outboard of the hub wall;

a combustor disposed in the diffuser plenum;

a core flowpath extending longitudinally across the plurality of compressor blades and through the compressor vane structure, the diffuser nozzle and the diffuser plenum into the combustor;

a baffle wall mounted to the diffuser structure, the baffle wall following a contour of the rotor hub and forming an outer peripheral boundary of at least the first section of the air passage, wherein an air cavity is disposed radially and/or axially between the baffle wall and the diffuser structure; and an air system including an air circuit and a heat exchanger, the air circuit extending longitudinally from a circuit inlet through the heat exchanger to a circuit outlet, and the air system configured to bleed compressed air from the core flowpath through the circuit inlet, cool the compressed air with the heat exchanger to provide cooled air, and direct the cooled air into the air passage through the circuit outlet in an axial direction towards a seal element, the seal element forming an axial boundary of the air passage.

* * * * *